(12) United States Patent
Kimura et al.

(10) Patent No.: US 7,691,467 B2
(45) Date of Patent: Apr. 6, 2010

(54) GYPSUM BOARD

(75) Inventors: Tatsukazu Kimura, Imabari (JP); Norio Tsuno, Imabari (JP); Seigo Ishibashi, Imabari (JP); Hirokuni Tani, Imabari (JP); Kenichiro Osawa, Imabari (JP)

(73) Assignee: Yoshino Gypsum Co., Ltd., Tokyo (JP)

( * ) Notice: Subject to any disclaimer, the term of this patent is extended or adjusted under 35 U.S.C. 154(b) by 10 days.

(21) Appl. No.: 11/508,002

(22) Filed: Aug. 22, 2006

(65) Prior Publication Data

US 2006/0280932 A1 Dec. 14, 2006

Related U.S. Application Data

(62) Division of application No. 10/508,885, filed as application No. PCT/JP03/03652 on Mar. 25, 2003.

(30) Foreign Application Priority Data

Mar. 27, 2002 (JP) ............................. 2002-089356

(51) Int. Cl.
*B32B 3/00* (2006.01)
(52) U.S. Cl. ...................... 428/192; 428/212; 428/220; 428/312.4
(58) Field of Classification Search ................. 428/212, 428/220, 192, 312.4
See application file for complete search history.

(56) References Cited

U.S. PATENT DOCUMENTS

| | | | |
|---|---|---|---|
| 1,514,827 A | 11/1924 | Birdsey | |
| 2,762,738 A * | 9/1956 | Teale | ........................... 428/126 |
| 3,459,620 A | 10/1965 | McCleary et al. | |
| 4,354,885 A | 10/1982 | White | |
| 5,683,635 A | 11/1997 | Sucech et al. | |
| 5,714,032 A | 2/1998 | Ainsley et al. | |
| 5,879,486 A | 3/1999 | Philips et al. | |
| 6,878,321 B2 | 4/2005 | Hauber et al. | |
| 2001/0044016 A1 | 11/2001 | Watras | |

FOREIGN PATENT DOCUMENTS

| | | |
|---|---|---|
| GB | 741140 | 11/1955 |
| JP | 4-505601 | 10/1992 |
| JP | 5-148001 | 6/1993 |
| JP | 8-112808 | 5/1996 |
| JP | 9-511702 | 11/1997 |
| JP | 2001-300933 A | 10/2001 |
| JP | 2001-340744 | 12/2001 |
| WO | WO 90/09495 | 8/1990 |
| WO | WO 95/32084 | 11/1995 |
| WO | WO 97/23337 | 7/1997 |

OTHER PUBLICATIONS

Machine translation for Japan 08-112808.*
European Search Report; Application No./Patent No. 03712937. 6—1255 / 1488920 PCT/JP0303652.

* cited by examiner

*Primary Examiner*—David R Sample
*Assistant Examiner*—Lawrence D Ferguson
(74) *Attorney, Agent, or Firm*—Ladas & Parry LLP

(57) ABSTRACT

A plaster board including a plaster core having a front surface, a back surface, two opposite side surfaces and two opposite end surfaces and a covering base paper covering the front surface, back surface, and two opposite side surfaces, which core includes high-density hard edge parts including the two opposite side surfaces, at least one high-density part including the front or back surface, and having a density substantially equal to densities of the high-density hard edge parts, and a central low-density part having a density less than the densities of the high-density hard edge parts and the high-density part and being inscribed in the high-density hard edge parts and the high-density part, wherein each of the high-density hard edge parts is formed so as not to be present in the nailing area along longitudinal directions of the board in which a nail for fixing the board is driven.

5 Claims, 11 Drawing Sheets

FIG.11A

| SAMPLE | DENSITY OF HIGH DENSITY LAYER (g/cm³) | | AVERAGE THICKNESS OF HIGH DENSITY LAYER (μm) | | DENSITY OF CENTRAL LAYER (g/cm³) | HARD EDGE | | | | |
|---|---|---|---|---|---|---|---|---|---|---|
| | FRONT SURFACE SIDE | BACK SURFACE SIDE | FRONT SURFACE SIDE | BACK SURFACE SIDE | | DENSITY (g/cm³) | SHAPE (L/J) | MAXIMUM THICKNESS IN WIDTH DIRECTIONS (mm) | MINIMUM THICKNESS IN WIDTH DIRECTIONS (mm) | MINIMUM THICKNESS OF PAPER ADHERED PART (mm) |
| EXAMPLE 1 | 0.95 | 0.95 | 500 | 500 | 0.65 | 0.95 | L | 12.5 | 4.2 | 3.1 |
| EXAMPLE 2 | 0.95 | 0.95 | 500 | 500 | 0.65 | 0.95 | J | 10.2 | 3.5 | 2.2 |
| EXAMPLE 3 | 0.95 | 0.95 | 500 | 500 | 0.66 | 0.95 | J | 7.6 | 2.8 | 1.5 |
| EXAMPLE 4 | 0.80 | 0.80 | 500 | 500 | 0.67 | 0.80 | J | 9.8 | 3.0 | 2.5 |
| EXAMPLE 5 | 1.05 | 1.05 | 300 | 300 | 0.64 | 1.05 | J | 4.4 | 0.5 | 0.2 |
| COMPARISON 1 | 0.99 | 0.96 | 100 | 150 | 0.67 | – | – | – | – | – |
| COMPARISON 2 | 1.10 | 1.06 | 100 | 150 | 0.69 | 0.73 | TRAPEZOID | 55.0 | 40.0 | 12.0 |
| COMPARISON 3 | 0.95 | 0.95 | 500 | 500 | 0.68 | 0.95 | TRAPEZOID | 30.0 | 20.5 | 11.9 |

FIG.11B

| SAMPLE | BASE PAPER ADHESION PROPERTY | | DRY OUT (DECKLE EDGE ADHESION) | | BOARD PROPERTIES | | | | NAILING PROPERTY |
|---|---|---|---|---|---|---|---|---|---|
| | FRONT SURFACE SIDE | BACK SURFACE SIDE | RIGHT EDGE PART | LEFT EDGE PART | NAIL PULLING OUT RESISTANCE (N) | FLEXURAL STRENGTH-LONGITUDINAL (N) | FLEXURAL STRENGTH-WIDTH DIRECTIONS (N) | | |
| EXAMPLE 1 | ○ | ○ | ○ | ○ | 360 | 550 | 229 | | ○ |
| EXAMPLE 2 | ○ | ○ | ○ | ○ | 359 | 551 | 230 | | ○ |
| EXAMPLE 3 | ○ | ○ | ○ | ○ | 361 | 547 | 228 | | ○ |
| EXAMPLE 4 | ○ | ○ | ○ | ○ | 358 | 557 | 231 | | ○ |
| EXAMPLE 5 | ○ | ○ | × | × | 370 | 580 | 240 | | ○ |
| COMPARISON 1 | ○ | ○ | ○ | ○ | 362 | 560 | 220 | | ○ |
| COMPARISON 2 | ○ | ○ | ○ | ○ | 369 | 570 | 235 | | × |
| COMPARISON 3 | ○ | ○ | ○ | ○ | 363 | 520 | 221 | | × |

GYPSUM BOARD

TECHNICAL FIELD

The present invention relates to a building material, particularly, a plaster board widely spread as an interior material and a fabrication method thereof. More specifically, the present invention relates to a plaster board having a multi-layer plaster core including a base paper for plaster board, a high-density layer adjacent to the base paper for plaster board, and a central part made from low-density foamed plaster, and high-density edge parts of which the areas are equal to or less than certain areas in both side edge parts of the plaster core, and a fabrication method thereof.

BACKGROUND ART

Plaster board has been widely used as a building material for the interior from the viewpoints of fire resistance, sound insulation, workability, and economy. The "plaster board" is a board-shaped body in which a plaster-based core (plaster core) is covered with a base paper for plaster board (simply, referred to as a base paper below). Generally, a plaster board is fabricated by the following steps (1)-(5).

(1) A calcined plaster, an adhesion assistant, a set accelerator, foam, and other additives, and water, etc., are kneaded by a mixer so as to obtain a calcined plaster slurry (simply, referred, to as a slurry below).

(2) While the plaster slurry is provided onto a lower-side (front surface-side) base paper (a front surface covering base paper) that is supported and moves on a long moving belt, opposite parts of the front surface covering base paper are folded so that margins of those parts reach to a back-surface side of the plaster board.

(3) At the back-surface side of the plaster board, margins of another upper-side base paper (a back surface covering base paper) are overlapped with the margins of the folded parts of the front surface covering base paper, wherein paste is applied on the margins of the back surface covering base paper.

(4) The slurry spread by and covered with the front surface covering base paper and the back surface covering base paper through a molding machine is molded into a board shape through the molding machine.

(5) After the slurry is hardened, the hardened plasterboard is roughly cut, subjected to forced-drying, and cut into a product size.

As a representative base paper for plaster board, a front surface covering base paper located on one surface of a plaster core and a back surface covering base paper located on the opposite surface of the plaster core are provided. The front surface covering paper covers opposite side-surfaces of the plaster core and the margins of the front surface covering base paper are pasted with the margins of the back surface covering base paper.

In order to save on the weight of the core, conventionally a cellular porous plaster core has been fabricated by introducing foam into a plaster core. For example, the cellular porous plaster core has been fabricated by adding a foaming agent into plaster slurry.

However, a core formed from only foamed plaster has two disadvantages. First, the hardened cellular porous plaster core is comparably fragile, and the cellular porous core is easy to crack and break as a nail is driven into the cellular porous plaster core under construction. The term of "nail" used herein means a component for holding a plaster board on a member, including not only a nail used for fixing the plaster board to a wooden substrate under construction of a building but also a machine screw (or a screw thread) used for fixing the plaster board to a metallic substrate (stud). Second, the cellular porous plaster core does not necessarily adhere to the base paper.

Regarding such problems, Japanese Laid-Open Patent Application No. 4-505601 discloses a plaster board characterized in that a single foamed slurry containing a comparably "easier broken foam" than foam in the conventional foamed slurry is deposited on a base paper and dried, an interface area containing fibers originating from the base paper and plaster originating a plaster core between the base paper and a surface of the plaster core and a layer containing no fiber adjacent and approximately parallel to the interface area are included, which layer includes plaster having fewer voids and greater density than in the central parts of the plaster core, which central part of the plaster core includes a multi-layer core having a plurality of discontinuous voids equal to or less than 1705 per square centimeter and approximately uniformly distributed throughout.

According to the conventional technique, a "separation" defect such that the paper on one surface of the plaster board is easily peeled from the plaster board can be significantly improved by a thin layer proximate to this paper and containing no fiber of the paper, and the strength of the plaster board can be significantly reduced by forming voids fewer and larger than the conventional voids in the hardened plaster board.

Additionally, in order to improve the adhesive property between the plaster core and the base paper, for example, Great Britain Patent No. 741140 discloses the technique of molding a plaster board by applying high-density slurry containing no foam on the adhesion surface of the base paper uniformly and thinly by a roller and providing low-density slurry containing foam onto the high-density slurry and then covering the low-density slurry with the base paper or providing another base paper on the surface of which the high density slurry containing no foam is applied uniformly and thinly by a roller.

Furthermore, Japanese Laid-Open Patent Application No. 5-148001 discloses a technique of molding a plaster board by providing high-density slurry containing an adhesive between a spreader roll and an idler roller, transferring slurry that adheres to the surface of the spread roller to the adhesive surface of the base paper so as to provide a thin plaster stratum on the adhesive surface, and providing low-density slurry containing foam onto the plaster stratum.

Next, drying of the plaster board is given as a large factor on fabrication in regard to adhesion of the plaster board. That is, in regard to the plaster board in a forced-drying process, generally, a drying rate in regard to a side edge part or side edge part area of the plaster board is comparably faster than a drying rate in regard to a central part of the plaster board. For this reason, in the side edge part or side edge part area, the degradation in the strength and the failure of adhesion (that is, dry-out) due to excessive drying easily occurs.

As a method of preventing the dry-out, for example, U.S. Pat. No. 2,762,738 discloses a technique of preventing the dry-out by providing high-density slurry from sub-mixers provided above both margins of the front surface covering base paper respectively onto the side edge portions of the slurry provided from a main mixer on the front surface covering base paper so as to form a plaster board, and making the core density at both side edge parts of the plaster board be larger than the density in the central part.

Similarly, Japanese Laid-Open Patent Application No. 9-511702 discloses an apparatus for forming a coating and side edge portions of a comparably high-density plaster slurry on a covering base paper by means of a coating roller rotating opposite to the moving direction of the covering base paper, and then forming a core including comparably low-density plaster between the side edge portions on the coating.

The length of the coating roller in the axial directions is smaller than the width of the covering base paper. Accordingly, the covering base paper with a normal width extends over the ends of the coating roller, and some slurry leaks out near both ends of the coating roller on the margins or the outside of the covering base paper. The base paper with a coating film is transferred on a deck along a transportation route of the base paper and an additional high-density slurry is poured onto the margins of the covering paper so as to form a rigid edge (hard edge) part. The apparatus for forming a core is provided with means for providing comparably low-density plaster slurry between the side edge portions on the coating.

However, in regard to a plaster board including a multi-layer core formed from a single foamed slurry disclosed in Japanese Laid-open Patent Application No. 4-505601, plaster is hardly ever or never stuck to the base paper due to density deficiency and the dry-out phenomenon in the side edge parts of the plaster board in formation of the plaster board and subsequent forced-drying, so that the defect of no base paper remaining on the plaster panel may occur. In order to reduce such a dry-out phenomenon, for example, as disclosed in Japanese Laid-Open Patent Application 11-501002, there is a method of preparing another high-density slurry and providing it onto the side edge parts of the plaster board so as to mold the plaster board. In this case, the area of the hard edge part originating from the high-density slurry becomes too large. Accordingly, when a nail is driven into the plaster board under construction, workability and/or subsequent finishing may be provided with such a disadvantage that the nail cannot sufficiently enter into the plaster board or the nail can enter but the head of the nail projects, at a nailing position along the side edge parts of the plaster board in the longitudinal directions.

In the conventional techniques disclosed in Great Britain Patent No. 741140 and Japanese Laid-Open Patent Application No. 5-148001, a plaster containing no foam may be too hard to practically function as an optimal material for a plaster board. Also, in a roll coater used in the fabrication method of these plaster boards, since the rotational direction of a spreader roll is the same as the transportation direction of a base paper, a slurry spread by the roller tends to adhere to the roller surface due to the tackiness of the slurry. As the result, the thickness of a thinly applied slurry layer is not constant along the transportation direction of the base paper. Furthermore, since the slurry adhering to the surface of the spreader roll is a reaction hardening type, in which calcined plaster as the main component contacts with water to harden, the slurry is hardening in progression and the gap between a spreader roll and an idler roller becomes narrower, during the rotation of the spreader roll. Consequently, the amount of the slurry provided onto the surface of the spreader roll and transported is reduced, so that the thickness of a thinly applied slurry layer varies with time so as to be not constant. On the other hand, after application of the slurry, even if a lump removing plate is provided across the entire roller along the longitudinal directions in order to remove a residual slurry on the roller surface, the removed slurry falls on the surface of a thinly applied slurry layer from the lump removing plate and consequently it is difficult to provide a slurry layer with a uniform thickness. Moreover, as slurry adhering to the side surface of the roller, etc., hardens and grows so as to make contact with a base paper, slurry causes cutting of the paper etc. As a result, such a problem that the production line has to be stopped persists.

Also, in the conventional technique disclosed in U.S. Pat. No. 2,762,738, since low-density and high-density slurries are separately prepared by a main mixer and a sub-mixer so as to be provided onto the central part and the margin of a base paper, respectively, fabrication processes and process management for the plaster board are cumbersome and complex, and the size of a hard edge part of the fabricated plaster board is not sufficiently controlled.

Similarly, in the conventional techniques disclosed in Great Britain Patent No. 74110 and Japanese Laid-Open Patent Application No. 5-148001, since two slurry mixers for preparing coating slurries for two base papers are used in addition to a main mixer, a configuration is required in which the controls of the mixers are difficult. Additionally, combining a plaster core and a base paper is disclosed by sticking a dense gypsum plaster slurry, particularly slurry containing a binder such as starch, etc. in the latter patent application, to the base paper by an applicator roller. However, there is no description for problems in regard to the dry-out and hard edge.

Additionally, the slurry in the main mixer used in the apparatus in Japanese Laid-Open Patent Application No. 9-511702 contains plaster, water, a forming agent, and a stabilizer, etc. and has a composition for forming the comparably low-density plaster slurry. Also, almost all of the air bubble contained in the slurry poured into the roller coating are removed by providing the foamed slurry from the main mixer through a pipe line to a high-speed beater and stirring the slurry by using a rapidly rotating wing of the high-speed beater. Thus, the slurry provided onto the roll coater or the margin of the covering base paper is a comparably high-density slurry. Accordingly, first in order to form a single foamed slurry, since the calcined plaster slurry and the foam are considerably stirred in the mixer, this conventional technique causes the problems of loss of the foam and ununiformity in the size of the air bubbles and the voids. Also, since defoaming capability of the high-speed beater has a limitation, it is difficult to provide the desired high-density slurry continuously and stably. Moreover, foam removed from the slurry provided onto the roll coater is wasted and the foaming agent and labor spent for forming foam are also wasted. Additionally, since the additional high-density slurry (hard edge slurry) is provided onto the margins of a cover sheet (base paper) provided with a slurry coating by the spreader roll through the pipe line, such problems that it is difficult to control the size of the hard edge part and it is difficult to drive a nail into the plaster board easily occur.

DISCLOSURE OF THE INVENTION

It is an object of the present invention to provide a lightweight plaster board having a cellular porous plaster core, excellent in adhesion to a covering base paper for a plaster board, free from dry-out in side edge parts of the plaster board due to forced drying in time of fabricating the plaster board, and with no disadvantage in workability for driving a nail into the plaster board.

Also, a further object of the present invention is to provide a method of fabricating a plaster board, excellent in adhesion of a cellular porous plaster core to a covering base paper for a plaster board, preventing dry-out, and with no disadvantage in driving a nail, in which the uniform cellular porous plaster core is provided without wasting a foaming agent and foam generated from the foaming agent due to a simple apparatus configuration.

The object described above is achieved by a plaster board including:

a plaster core having a front surface, a back surface, two opposite side surfaces and two opposite end surfaces thereof, and a covering base paper that covers the front surface, the back surface, and the two opposite side surfaces of the plaster core, the plaster core including a high-density hard edge part including the side surface covered with the covering base paper, at least one high-density part including the front surface or the back surface covered with the covering base paper and having a density substantially equal to a density of the high-density hard edge part, and a central low-density part having a density less than the densities of the high-density hard edge part and the high-density part and being inscribed in the high-density hard edge part and the high-density part, wherein the high-density hard edge part is formed so as to be prevented from including a predetermined position at which a nail for fixing the plaster board is driven along the side surface.

In the plaster board, the high-density part may have a thickness of 0.1 mm through 1.2 mm along a direction perpendicular to the front surface or the back surface.

In the plaster board, the high-density hard edge part may have a thickness of at least 0.1 mm along a direction perpendicular to the side surface included in the high-density hard edge part.

In the plaster board, the high-density hard edge part may have a thickness of 0.1 mm through 15.0 mm along a direction perpendicular to the side surface included in the high-density hard edge part.

The object described above is also achieved by a method of fabricating a plaster board including a plaster core having a front surface, a back surface, two opposite side surfaces and two opposite end surfaces thereof, a front surface covering base paper that covers at least the front surface and the two opposite side surfaces of the plaster core, and a back surface covering base paper that adheres to the front surface covering base paper and covers the back surface of the plaster core, in which the plaster core has a high-density hard edge part including the side surface, the method including the steps of:

(a) pouring calcined plaster, water, at least one kind of additive and/or admixture into a disk-type rotary mixer and stirring to prepare a calcined plaster slurry, (b) extracting one portion of a slurry of the calcined plaster from at least one fractionation port provided on a peripheral area of the disk-type rotary mixer and providing the one portion of the slurry as a slurry for application onto the front surface covering base paper, (c) spreading one portion of the slurry for application provided on the front surface covering base paper by a spreader roll to form a spread portion of the slurry for application while providing non-spread portions of the slurry for application at both sides of the spread portion, (d) delivering the slurry of the calcined plaster remaining in the disk-type rotary mixer through a delivery pipe provided on the peripheral area of the disk-type rotary mixer to a delivering port of the delivery pipe, (e) pouring a foam into the remaining slurry of calcined plaster through one of the delivery pipe and a foam providing port set on the delivery pipe and uniformly dispersing the foam to prepare a slurry for core, (f) depositing the slurry for core delivered from the delivering port onto the slurry for application applied on the front surface covering base paper, and (g) folding the front surface covering base paper and adhering the back surface covering base paper to a margin of the front surface covering base paper to form a stack and subsequently to dry the stack, wherein a length of the spreader roll in axial directions is 98% through 108% of a distance between boundary lines of the front surface and the side surface.

In the method of fabricating a plaster board, the step of providing the slurry for application onto the back surface covering base paper and spreading the slurry for application provided on the back surface covering base paper by a spreader roll may be further included.

In the method of fabricating a plaster board, a thickness of the spread portion may be 0.2 mm through 1.5 mm.

In the method of fabricating a plaster board, the step of adding water and a set retarder to the slurry for application may be further included.

In the method of fabricating a plaster board, the step of adding a foam to the slurry for application may be further included.

In the method of fabricating a plaster board, a thickness of the slurry for application spread by the spreader roll, provided on the back surface covering base paper, may be 0.2 mm through 1.5 mm.

In the method of fabricating a plaster board, the step of adding water and a set retarder to the slurry for application to be provided onto the back surface covering base paper may be further included.

In the method of fabricating a plaster board, the step of adding a foam to the slurry for application to be provided onto the back surface covering base paper may be further included.

BRIEF DESCRIPTION OF THE DRAWINGS

Other objects and features of the present invention will become more apparent from the following detailed description in conjunction with the accompanying drawings, in which:

FIGS. 11A and 11B are tables showing properties of plaster boards according to the present invention.

BEST MODE FOR CARRYING OUT THE INVENTION

Figure 1:
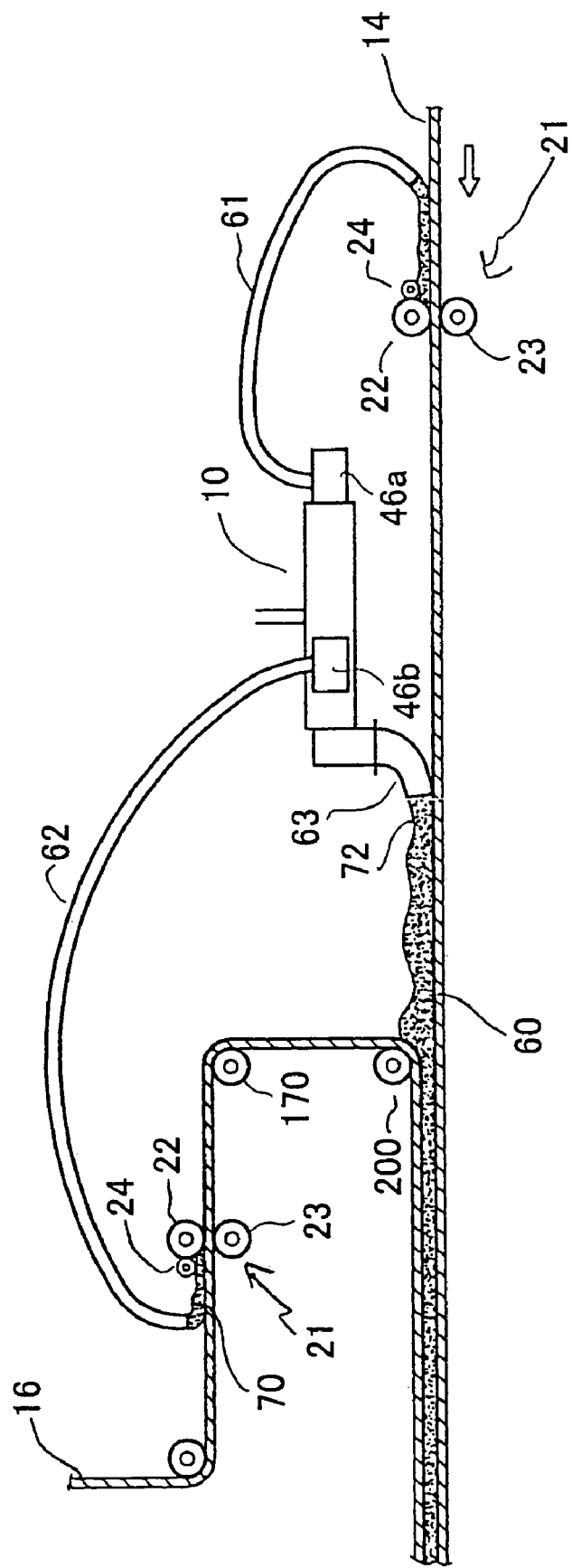
FIG. 1 is a side view of an apparatus for molding a plaster board according to the present invention.

To achieve the first object described above, in the present invention, at least two slurries having densities different from each other are used and one of those slurries is a high-density slurry that is applied on a front surface covering base paper by a spreader roll having a length in roll-axial directions that is equal to or more than a width between two margin fold lines on the front surface covering base paper, the width defining the width of a plaster board. Also, a non-spread portion of a slurry for application is provided on opposite margins along margin fold lines on the surface of the front surface covering base paper in order to form a hard edge part. Herein, the size of the non-spread portion of the slurry for application is adjusted so as to allow for driving a nail. Then, a low-density slurry (slurry for core) is deposited on the slurry for application applied on the front surface covering base paper. The high-density and low-density slurries provided on the front surface covering base paper as described above are covered with the folded front surface covering base paper and a back surface covering base paper so as to form a stack, and the stack is subjected to forced-drying to obtain the desired plaster board. Additionally, it is also preferable to apply the slurry for application on the back surface covering base paper by a spreader roll having an appropriate length in roll-axial directions before forming the stack. In this case, application of the slurry for application on the back surface covering base paper is similar to the application for the front surface covering base paper except applying no slurry for application on the margins being as overlap width.

Also, to achieve the second object described above, at least two slurries are prepared by one mixer. The mixer has a housing with a ring wall and two disks at the upper surface and the lower surface, a providing port disposed on the central part in the upper surface of the housing in order to provide materials to be kneaded into the housing, a slurry delivering port disposed on a peripheral area of the housing for continuously delivering slurry to outside of the housing, a rotating table disposed roratably in the housing, and a rotary driving device for rotating the rotating table. The materials to be kneaded are provided into the housing through each providing port, stirred and mixed by the rotating table, moved to the ring wall along the radial direction on the rotating table by centrifugal force, mixed or not mixed with the foam, and delivered out of the mixer through the slurry delivering port. At least one fractionation port for extracting at least one portion of slurry is provided on the peripheral area of the housing.

In the embodiment of the method of fabricating a plaster board according to the present invention, kneaded slurry contains a calcined plaster, water, an adhesion assistant, a set accelerator, a foam for saving weight of the plaster board, a water-reducing agent, a set retarder, a roll over-suppressing agent, an over-drying inhibitor, a water-proofing agent, and other additives, and further reinforcing fiber, a light-weight aggregate, and other inorganic admixtures, etc.

In the preferred embodiment of the present invention, the density of the slurry is determined by a mixing water amount and a mixing amount of foam. According to the mixer, one portion of the slurry can be delivered out of the mixer and employed as a material for application (slurry for application) that is applied on the adhesion surface of a base paper for plaster board before mixing foam. Thus, two kinds of slurries, that is, both a high-density slurry containing no foam and a low-density slurry containing foam can be provided by a single mixer according to need.

In such a mixer, it is preferable that the fractionation port for extracting one portion of the high-density slurry be provided with a slit reaching at the fractionation port along the peripheral area of the housing of the mixer. According to the slit, production of lumps originating from the presence of remaining slurry and hardening of the remaining slurry can be reduced or prevented so as to stably and continuously provide the slurry for application. Consequently, it is possible to continuously fabricate the plaster board according to the present invention. It is also preferable to provide intermittent cleaning means for cleaning inside of the fractionation port regularly. Various kinds of intermittent cleaning means can be utilized, for example, water pouring means or a piston pin and a movable plate, etc., fitted to the internal shape of the fractionation port through which slurry flows. The flow rate of the slurry can be changed by pushing and pulling the piston pin or the movable plate quickly. In the preferred embodiment of the present invention, intermittent cleaning inside the fractionation port is automatically performed per a certain period.

Also, in the present invention, in order to provide a non-spread portion of the slurry in the plaster board, it is also important to strictly control the amount of the slurry for application provided on both ends of the spreader roll. That is, the amount of the high-density slurry that is extracted from the fractionation port, the number of revolutions of the spreader roll, and the gap between the spreader roll and a backing roll, etc., are adjusted to an optimum condition in any time. Additionally, if required, both margins of the front surface covering base paper may be folded upward so as to restrict the range in which the slurry spreads.

The width of the non-spread portion is generally less than 10 mm, preferably equal to or less than 5 mm, and most ideally, to be adjusted as small as possible. Thus, the high-density slurry containing no foam can be used as the slurry for application by adjusting the width of the non-spread portion to be comparably small. At least one additive providing port is disposed on the fractionation port or a slurry delivery pipe extending from the fractionation port to the spreader roll so as to prepare the slurry for application by adding and mixing water and a set retarder. As taking a time interval until the slurry for application contacts with the slurry for core in consideration, hardening time of the slurry for application may be adjusted. For example, in the case of using a single mixer, drain of the slurry for application out of the mixer may be performed relatively more slowly than drain of the slurry for core. Also, until the fractionated slurry for application makes contact with the slurry for core, the time is required for the slurry for application to be delivered through the delivery pipe to spreader roll and applied on a base paper. Accordingly, it is preferable that a hardening time of the slurry for application be longer than a hardening time of the slurry for core. Additionally, such hardening times should be adjusted appropriately dependent on the respective fabrication conditions of the plaster board.

Also, if required, a foam may be further added to the slurry for application so as to adjust the density of the slurry for application. Herein, the foam is foam produced from a foaming agent, the density and the load of foam into the slurry for application can be adjusted according to the desired density of the slurry for application. It is preferable that the density of foam used in the embodiment be equal to or less than the density of foam for core as mentioned below.

In the preparation of the slurry for application as described above, if required, a sub-mixer may be installed. The sub-mixer is not only useful for stirring the slurry for application so as to make uniform the composition but also useful for adjustment of the density and control of the quantity of flow of the slurry, and thus, useful for providing a constant amount of the slurry for application with stable quality. Such a sub-mixer has a comparably simple configuration, and maintenance and inspection works for the apparatus or devices is not made cumbersome and complicated.

Additionally, without deviating from the object of fabricating the plaster board according to the present invention, the foam used mainly for adjusting the density of the slurry for application may be added through the foam providing port set on the mixer before the slurry is delivered outward from the mixer.

Also, a foam providing port is disposed on a delivering port for the slurry for core or a delivery pipe for the slurry for core that connects to the delivering port, and foam for adjusting the volume of the slurry is provided to the slurry for core delivered from the delivering port through the foam providing port. Since the injection of the foam for core can be controlled outside the mixer, the loading of foam can be reduced. Additionally, the foam providing port may be provided at the upstream side of the delivering port for the slurry for core along the rotational direction of the mixer and in the peripheral area at the downstream side of the fractionation port for slurry so as to provide the foam into the slurry for core. Also, a foam may be provided to slurry in the inner area of the mixer without deviating from the objects of the present invention. Herein, the density of the provided foam is generally 0.01 through 0.50 $g/cm^3$. While the foam is delivered through the delivering port, the foam is uniformly dispersed into the slurry for core. Without wasting the foam, in order to efficiently produce a low-density slurry for core in which air bubbles and voids are distributed uniformly, foam is injected into the flow of the delivered slurry. Also, a conventional means such as the application of spiral rotation or gradual shearing force to the slurry, etc. can be utilized.

In the preferred embodiment of the mixer used in the present invention, a plurality of tooth-profile parts are formed on the periphery of the rotating table. Thus, tooth-profile parts of the rotating table are set between the central area and the ring wall provided along the periphery of the housing. A calcined plaster and a component that is kneaded into the calcined plaster are moved outwardly in the radial direction on the rotating table due to centrifugal force, while being stirred and mixed. The slurry in the peripheral area (slurry remained area) in which the substantially perfectly mixed slurry remains is introduced to the slurry delivering ports by the rotating tooth-profile parts. Also, the slurry delivering port(s) is provided on one or both of a bottom cover (lower plate) and the ring wall of the housing near the slurry remained area, and the number of the slurry delivering port is set dependent on the object, the use, or the design condition. That is, one or more slurry delivering ports can be provided on the housing. Also, in the case of setting the slurry delivering port on the bottom cover or the lower plate near the slurry remaining area, the tooth-profile parts are necessary components of the rotating table whereas in the case of providing the delivering port on the ring wall, the tooth-profile parts can be omitted.

Additionally, on the upper cover of the housing of the mixer, a ring-shaped partition wall extending to near the upper surface of the rotating table perpendicularly is provided. The ring-shaped partition wall compartmentalizes the slurry remaining area near the periphery of the rotating table and the central area of the rotating table, that is, unmixed slurry and mixed slurry. As a result, a high-density uniform slurry can be certainly obtained from the peripheral area of the mixer. When the obtained slurry is provided to the place away from the mixer, a delivery or pressure pump in the pipe connecting with the fractionation port is also set for delivering the slurry to the location or sending the slurry to the location with pressure.

Furthermore, the fractionation port can be preferably disposed on a part of the housing near the slurry remaining area, that is, the upper cover or upper plate, the bottom cover or lower plate, or the ring wall, and the number of the fractionation ports is not limited to one and may be equal to or more than two dependent on the object, the use, or the design condition. However, in the case of providing the fractionation port on the bottom cover or lower plate, it is necessary to form the tooth-profile parts on the periphery of the rotating table. The slurry extracted through the fractionation port is used as a material for application that is applied on the adhesion surface of a base paper.

Also, in the present invention, while the base paper is delivered in the longitudinal direction of the base paper by base paper delivery means, a spreader roll is disposed almost parallel to the base paper, along the directions of the width of the base paper, and away from the upper surface of the base paper with a certain space or contacting with the upper surface of the base paper. In addition, a roll coater having a supporting member (a backing roller) for supporting the base paper and the base paper delivery means for delivering the base paper in the longitudinal direction of the base paper is used. A slurry providing means for providing the high-density slurry for application onto the upper surface of the base paper and spreader roll-rotary driving means for rotating the spreader roll in the direction reverse to the delivery direction of the base paper are further provided at the upstream side from the spreader roll in the direction of delivering the base paper. Thus, spread slurry is provided between the upper surface of the base paper for plaster board and the bottom end of the roller surface of the spreader roll.

At the upstream side from the spreader roll in the direction of delivering the base paper, the slurry for application is provided onto the upper surface of the base paper and the slurry for application is passed through a gap with certain size or transferred from the roll surface of the spreader roll. Thus, the slurry for application is spread in the directions of width of the base paper so as to form a thin layer of the slurry for application. Also, slurry for application that does not pass through the gap with a certain size or the contact part returns at the upstream side of the spreader roll in the direction of delivering the base paper along the roll surface by rotating the spreader roll to the direction reverse to the direction of delivering the base paper. Furthermore, a non-spread portion is formed using the spreader roll by adjusting the amount of the slurry for application that is provided on an area of the margin of the base paper outside the end of the spreader roll. Thus, the sizes of a side edge part and a side edge part area of the plaster board can be controlled so as to make the side edge part and the side edge part area of the plaster board be high density.

In the fabrication method of the plaster board according to the present invention, the slurry for application is applied onto the front surface covering base paper and/or the back surface covering base paper of the plaster board by the spreader roll, and the lower-density slurry is provided between thin layers of the high-density slurry formed on the front surface covering base paper and the back surface covering base paper so as to form a stack, which is subsequently dried. Also, it is preferable that opposite margins of the front surface covering base paper be folded upward along the longitudinal directions before forming the stack so as to prevent the slurry from flowing from the non-spread portion to the margin of the front surface covering base paper.

Also, if required, it is preferable that a lump removing roll disposed parallel to the spreader roll and in contact with the roller surface of the spreader roll be installed. The lump removing roll is disposed at the upstream side from the spreader roll in the direction of delivering the base paper, and the center height of the lump removing roll is equal to or less than the center height of the spreader roll. Thus, the slurry can be prevented from remaining on the spreader roll surface at the running side of rotation of the spreader roll from the contact part of the spreader roll and the lump removing roll. Additionally, change in the thickness along the direction of delivering the base paper and time dependent change of the thin layer of slurry are prevented so as to make uniform the thickness of the thin layer of the slurry. As a result, the adhesive property between the plaster core and the base paper can be improved.

It is preferable that the lump removing roll further have rotary driving means for lump removing roll to rotate the lump removing roll in the direction reverse to the rotational direction of the spreader roll and the rotational speed of the lump removing roll be equal to or less than the rotational speed of the spreader roll. In addition, it is preferable that the lengths of the spreader roll and the lump removing roll in the longitudinal directions be same and a lump removing plate disposed in contact with the contact parts of respective ends of the spreader roll and the lump removing roll be further included. Also, it is preferable that the hardness of the roller surface of the spreader roll be higher than the hardness of the roller surface of the lump removing roll and the hardness of the supporting surface of the supporting member.

The thickness of the slurry for application that is applied on the base paper by the spreader roll is preferably approximately 200 through 1,500 μm, and more preferably 400 through 1,000 μm. When the thickness of the applied slurry is less than 200 μm, the adhesion between the dried plaster core and the base paper is not enough. On the other hand, in the case of being greater than 1,500 μm, the effect of the adhesion cannot be improved any more any longer. Also, the thickness is disadvantageous for weight saving, and workability of driving a nail, etc., is lowered since the plaster board is hard. When the thickness of the applied slurry is as described above, the thickness of the high-density layer of the fabricated plaster board including a multi-layer core is approximately 100 through 1,200 μm. Further preferred thickness of the high-density layer is approximately 200 through 1,000 μm.

Also, according to the preferred embodiment of the present invention, when the high-density slurry is applied on the base paper, the length of the spreader roll (the length in the direction of the roller axis) is preferably 98 through 108%, more preferably 99 through 105%, of the width between margin fold lines (scorings defining side ends of the board) of the front surface covering base paper that defines the width of the plaster board as a product. The upper limit (%) of the length of the spreader roll is appropriately determined, preferably dependent on the width of the front surface covering base paper that is used according to the standards of the thickness of an objective plaster board. Additionally, an end shape of the plaster board is generally three kinds, that is square, taper, and bevel, corresponding to the kinds of techniques such as joints spacing and butt laying technique, joint treating technique, and V-joint technique with respect to application of a plaster board. Herein, the term of "width of plaster board" is the maximum value of the length between both side ends of a plaster board, regardless of the shape of an end of the plaster board. Accordingly, the aforementioned "width between margin fold lines on the margins at both sides of a front surface covering base paper, defining the width of the plaster board (scorings defining edges of the board)" represents a space between two lines for margin folding that are valley fold lines applied along both margins of the front surface covering base paper using a file, etc. and define the width of the board. Also in regard to the shape of an end of the spreader roll, the diameter of the spreader roll near the end is reduced so as to provide a step, the diameter is tapered toward the end of the spreader roll so as to provide a taper ("forward taper"), or it is allowed to combine the step and the forward direction taper. The thickness of the slurry for application can be made larger intentionally by providing the step and/or the forward taper to both ends of the spreader roll, and a buffer (buffering) function for adjusting the amount of the slurry for application leaking to a non-spread portion can be provided to the spreader roll. Additionally, if required, it is preferable to modify the shape of the lump removing roll and to provide another lump removing means according to the shapes of both ends of the spreader roll.

Thus, an application area of an adhesion layer for the base paper can be kept to be the maximum. In addition, when a non-spread portion is formed on an area of the margin of the base paper outside the end of the spreader roll by leakage of excessive slurry for application, since the leakage of the slurry to the non-spread portion can be controlled to decrease, consequently, the thickness of a hard edge part of the formed plaster board can be also controlled.

In the plaster board according to the present invention, when the plaster board is nailed to a member, the hard edge part is not present in a nailing area along the hard edge part in the longitudinal directions of the plaster board. Accordingly, the length of the hard edge part in the direction of the width of the plaster board is commonly equal to or less than approximately 15.0 mm, preferably equal to or less than approximately 10.0 mm. Furthermore, from the view point of weight saving for the plaster board and effective utilization of a material in fabrication, the length of the hard edge part in the direction of the width of the plaster board is preferably equal to or less than approximately 5.0 mm. Also, although the minimum value of the length of the hard edge part in the direction of the width of the plaster board is approximately 0.1 mm (=100 μm), the minimum value is preferably approximately 2.0 mm, more preferably approximately 3.0 mm in order to prevent dry-out more stably, or to manage a fabrication condition such as a control for loading of the slurry, etc.

Additionally, in the conventional technique, the length of the spreader roll (the length in the direction of roller axis) has been shorter than the width between the margin fold lines of the base paper. For example, the length is 1.15 m (45 inch), that is approximately 94.3%, in production of the plaster board with 1.22 m×2.44 m (4×8 ft) as disclosed in Japanese Laid-Open Patent Application. No. 09-511702, and thus the length of the spreader roll has been set to be considerably short. Also, as disclosed in Japanese Laid-Open Patent Application No. 08-112808, the width of the non-spread portion of the high-density slurry is 10 mm through 50 mm, and since a hard edge part originating from the non-spread part of the high-density slurry often reaches an area for nailing and a nail impinges to the hard edge part, it may be difficult to drive a nail into the plaster board. In the present invention, the length of the spreader roll is equal to or more than 98% of the width between the margin fold lines of the front surface covering base paper, and is further 108% that is over the standard width of a plaster board, so that the hard edge part does not reach an area for nailing. For example, the width of the hard edge part can be appropriately controlled to be equal to or less than approximately 15.0 mm. The width of the hard edge part is preferably equal to or less than 10.0 mm, more preferably equal to or less than approximately 5.0 mm, but is dependent on working condition for setting the plaster board. In order to control the width of the hard edge part to be, for example, equal to or less than 12.0 mm, the length of the spreader roll (the length in the direction of roller axis) is made to be equal to or more than approximately 99% and the amount of the slurry for application leaking to the non-spread portion is adjusted.

The thickness of the high-density layer and the thickness of the hard edge part as described above can be measured by providing the fabricated plaster board with a broken end, folding, and observing a cross section of the plaster board using SEM. The plasterboard according to the present invention has a feature in the length and the shape of the hard edge part along the direction of the width of the plaster board. That is, the width of the hard edge part formed from the non-spread portion of the slurry for application, along the direction of the width of the plaster board is approximately 0.1 mm through approximately 15.0 mm. Also, the shape of the hard edge part in a cross section along the direction of the width of the plaster board may be various shapes such as a quadrangular shape, a triangular shape, a crescentic shape, a L-shape and a J-shape, etc. In order to make the minimum value of the width of the hard edge part in a cross section of the direction of the width of the plaster board be smaller, it is preferable to have a L-shape or a J-shape. The length of an adhesion part in the interface of the front surface covering base paper and the hard edge part is at least approximately 0.1 mm in a cross section along the direction of the width of the plaster board. In order to prevent dry-out and to make control of a fabrication condition be easier, the thickness of the adhesion part between the hard edge part and the base paper for board is preferably at least approximately 2.0 mm, more preferably, at least approximately 3.0 mm.

Thus, the prevention of the dry-out and easy control of the fabrication condition are achieved by providing a spreader roll having a length (in the direction of the roll axis) of 98 through 108% of the width between margin fold lines (scorings) of the front surface covering base paper, defining the width of the plaster board, and by forming a non-spread portion of the high-density slurry for application onto both side ends of the plaster board. That is, as compared to the size of the non-spread portion in the case of using the conventional spreader roll having a length of less than 95% of the aforementioned width, in the case of using the comparably longer spreader roll in the present invention, the size of the non-spread portion can be restricted to be smaller if supply of slurry is controlled so that the slurry for application does not fall from the base paper. Thus, as the result of molding of the plaster board, the maximum length of the hard edge part originating from the non-spread portion of the slurry in the direction of the width of the plaster board can be equal to or less than 15.0 mm. Also, the slurry for application leaking to the non-spread portion is applied to the outside of the margin fold line (scoring) of the front surface covering base paper. Accordingly, in the molding of the plaster board, when the front surface covering base paper passes through a folding shoe part for folding the margins of the front surface covering base paper upward along the margin fold lines (scorings), one portion of the slurry applied to the outside of the margin fold line (scoring) falls along the internal surface of the margins of the base paper due to gravitational effect. Additionally, resulting from folding upward at the margin fold lines (scorings) by the folding shoe, one portion of the slurry for application may contact with an overlapping area for adhesion with the back surface covering base paper along the internal surface of the margins of the front surface covering base paper. Subsequently, the slurry for application contacts with the slurry for core in which a certain foam is added so as to start to harden. As a result, the hard edge part having various shapes such as a quadrangular shape, a triangular shape, a crescentic shape, a L-shape and a J-shape, etc., is formed. Among these, in the preferred embodiment of the present invention, it is desirable to form a hard edge part having a L-shape or a J-shape. Although the thickness of such L-shape or J-shape hard edge part in the direction of the width of the plaster board may be the minimum thickness required for preventing the dry-out, at least approximately 0.1 mm (=100 μm) is required taking practical workability and stability of a continuous fabrication into consideration.

The preferred embodiment of the present invention will be illustrated in detail by referring to appending drawings below, however, the present invention is not limited to them.

FIG. 1 is a side view showing an apparatus for molding a plaster board according to the present invention partially and schematically. A front surface covering base paper 14 is delivered along a production line. A mixer 10 is disposed on a certain position associated with the delivery line, for example, disposed above the delivery line, and high-density slurry and low-density slurry can be provided by the single mixer 10. Herein, in order to fabricate the plaster board according to the present invention, conventional mixers may be provided so as to provide the high-density and the low-density slurries, respectively. Powder such as calcined plaster, adhesion assistant, a set accelerator, and additives, etc., foam, and water are provided to the mixer 10, and the mixer 10 kneads the raw materials as described above and provides the high-density slurry 70 through delivery pipes 61 and 62 onto the front surface covering base paper 14 and a back surface covering base paper 16 at the upstream side of a roll coater 21 in the delivery direction. Herein, 22, 23, and 24 represent a spreader roll, a backing roll, and lump removing roll, respectively. The slurries on the front surface covering base paper 14 and the back surface covering base paper 16 reach spreader parts 20 of the roll coaters 21 and are spread at the spreader parts 20, respectively. Both a thin layer and a side edge part area of the high-density slurry 70 are formed on the front surface covering base paper 14 and the thin layer of the high-density slurry 70 is formed on the back surface covering base paper 16. The front surface covering base paper 14 is delivered directly, and the back surface covering base paper 16 is turned to the delivery direction of the front surface covering base paper 14 by a turning roller 170. Then, both the front surface covering base paper 14 and the back surface covering base paper 16 reach a molding machine 200. Herein, low-density slurry 72 is provided between thin layers on the respective base papers 14 and 16 through a pipe line 63 from the mixer 10. A sequential stack having a tri-layer structure made of the front surface covering base paper 14, the low-density slurry 72, and the back surface covering base paper 16 is formed, and the stack hardens and reaches a roughly cutting machine (not shown in the figure). The roughly cutting machine cuts the sequential stack into board-shaped bodies with a certain length, so that a board-shaped body made of a plaster-based core covered with the base paper, that is, a raw material of the plaster board is formed. The roughly cut stack further passes through a drying machine (not shown in the figure), is subjected to forced-drying, and subsequently, is cut into products with a certain length. Thus, the product of the plaster board is fabricated.

Figure 2:
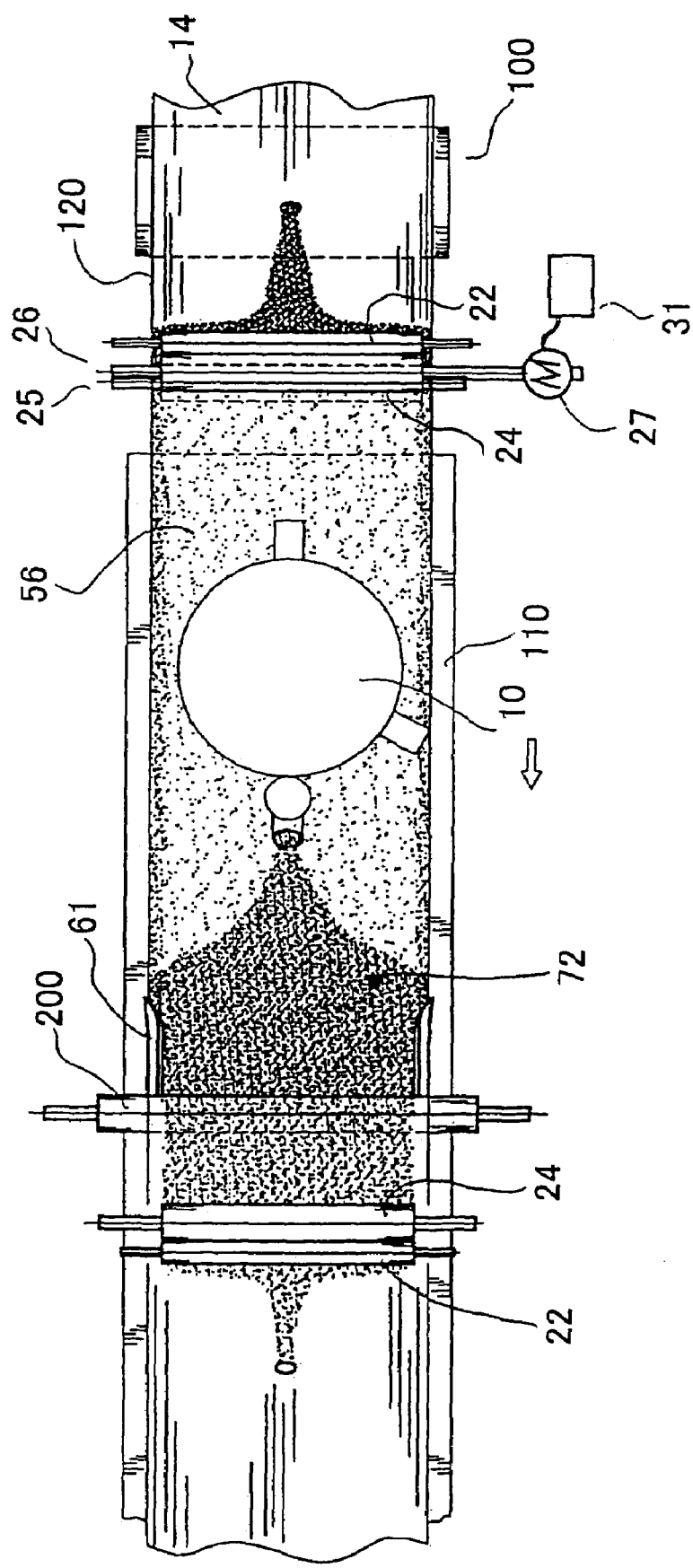
FIG. 2 is a plan view of an apparatus for molding a plaster board according to the present invention.

FIG. 2 is a plan view of the apparatus for molding the plasterboard according to the present invention shown in FIG. 1. The apparatus shown here has a flat deck. A providing roll (not shown in the figure) is rotatably installed adjacent to the deck 100 and provides the front surface covering base paper 14 to the deck 100. The front surface covering base paper 14 moves on the upper surface to the downstream direction (left) represented by the arrow (←).

In the downstream of the deck 100, the second deck 110 is disposed apart from the deck 100 and a deck cut out, that is, a gap 120 is provided between the two decks 100 and 110.

The width of the representative product of the plaster board is 910 mm and the widths of the front surface covering base paper 14 and the two decks are slightly wider than the width of the product. The front surface covering base paper 14 forms a front surface of the plaster board.

Figure 3:
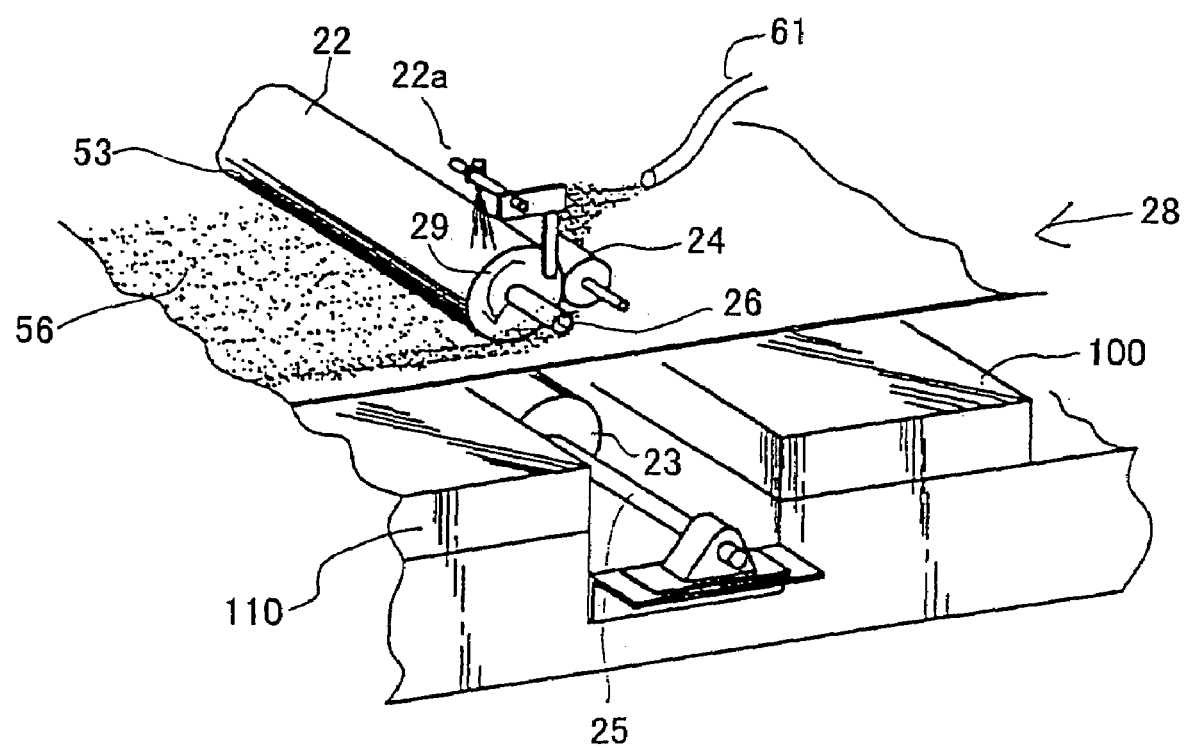
FIG. 3 is a perspective view of a roll coater used in the present invention.

FIG. 3 is a partial perspective view of a roll coater used in the embodiment of the present invention. In FIG. 3, the roll coater 21 is generally configured with slurry providing means 61 for providing slurry onto the upper surface of the front surface covering base paper 14, a spreader roll 22 disposed above the front surface covering base paper 14, a lump removing roll 24 disposed at the upstream side of the flow of the base paper relative to the spreader roll 22, a backing roll 23 disposed under the front surface covering base paper 14, spreader roll-rotary driving means and lump removing roll-rotary driving means (not shown in the figure) for rotary driving of the spreader roll 22 and the lump removing roll 24, respectively.

A transportation route for transporting the front surface covering base paper 14 extends from the upper surface of the deck 100, through a gap between the backing roll 23 and the spreader roll 22, to the upper surface of the deck 110. Two rolls 22 and 23 are installed on shafts 25 and 26, respectively. Whereas the backing roll 23 is not driven by a motor and the surface velocity is essentially the same as one of the front surface covering base paper 14, the spreader roll 22 is driven by a motor 27 and the surface moves opposite to the movement direction of the front surface covering base paper 14 as illustrated by arrows 28 and 29 shown in FIG. 3. A power supply and motor speed control device 31 are connected to drive the motor 27.

The backing roll 23 is a comparably soft roll and may be made from, for example, sponge rubber. On the other hand, the spreader roll 22 is hard, is highly polished, and may be, for example, a polished chrome plating roll. The two rolls contact each other or provide a gap 33 with an appropriate space (see FIG. 3). The front surface covering base paper 14 moves through a nip 32 or a gap 33 and the surface of the cover sheet cleans the lower surface of the spreader roll 22. The front surface covering base paper 14 passes through the lower side of the spreader roll 22 and the surface of the spreader roll 22 is cleaned by the front surface covering base paper 14. It is important not to stop the rotation of the spreader roll 22 in operation.

The mixer 10 containing much plaster slurry is installed above the deck 110 (see FIG. 1).

A pipe line 61 extends from the mixer 10 to a roll coater 21 for the front surface covering base paper 21. Another pipe line 62 extends to a roll coater 21 for the back surface covering base paper. The slurry flowing toward the two roll coaters is a high-density plaster slurry.

Particularly, as referring to FIG. 3, the spreader roll 22 of the roll coater 21 has the shaft 26 above the shaft 25 of the backing roll 23. The slurry for application 70 flows from the pipe lines 61 and 62 so as to fill a trough over the length of the spreader roll 22. The spreader roll 22 rotates counter-clockwise (as shown in FIG. 3). The front surface covering base paper 14 contacts with the lower surface of the spreader roll 22 and is pulled toward downstream by a normal driving device (not shown in the figure). Furthermore, the soft backing roll 23 makes the front surface covering base paper 14 contact with the spreader roll 22. The front surface covering base paper 14 moves opposite to the movement direction of the surface 53 of the spreader roll 22 and cleans the surface of the spreader roll 22, as described above. As the result, the coating 56 transfers to the front surface covering base paper 14 and an almost uniform coating or layer 56 is formed across the central area of the cover sheet. The thickness of the coating 56 varies with movement velocity of the cover sheet relative to the rotational velocity of the spreader roll 22, and the control device 31 is preferably adjusted to make a coating with a desired thickness.

As shown in FIG. 2, the length of the two rolls 22 and 24 in the axial directions are 98 through 108% of the width between margin fold lines of the front surface covering base paper, defining the width of the plaster board, such that a non-spread portion is formed between an end of the spreader roll and a side of the front surface covering base paper by leakage of the slurry for application. Accordingly, the spreader roll extends over the margin fold lines (scorings) of the front surface covering base paper, defining the width of the plaster board, and some of the slurry for application 70 leaks, near both ends of the spreader roll 22 on the margins or to the outside of the front surface covering base paper 14. In the present invention, the amount and the width of the slurry for application 70 that is not extended by the spreader roll 22 are particularly strictly controlled, and for example, the width is adjusted to be less than approximately 10 mm, preferably equal to or less than approximately 5 mm.

A plaster core 73 of the plaster board is formed by the slurry from the mixer 10, which is provided onto the central area of the front surface covering base paper 14 with a coating through the pipe line 63. As shown in FIG. 2, the slurry is spread on the coating 56 across the front surface covering base paper 14.

Normal folding shoes 61 provided on both sides of the deck 110 along the margins of the front surface covering base paper 14 fold both margins of the front surface covering base paper 14 upward, and then fold parts of both margins onto the slurry. The folding shoes 61 form the opposite long sides of the finished board. Then, the back surface covering base paper 16 is put on the core 60 and the parts of the margins of the front surface covering base paper. The back surface covering base paper separates from a providing roll 64 (not shown in the figure), passes under the molding machine 200 for guiding the back surface covering base paper, making the upper surface of the slurry be smooth, and making the thickness of the slurry be a desired value. In the finished product, the front surface covering base paper 14 makes a front surface and side surfaces of the plaster board that is formed according to the standard, and the back surface covering base paper 16 makes a back surface of the plaster board that is formed according to the standard.

After the back surface covering base paper is disposed, the plaster board is treated by a usual method. The two covering base papers and the slurry are moved to a location at which the plaster board can be treated, along the deck 110, by hardening of the slurry. Then, the plaster board is cut into a desired length, reversed, and subsequently, moved through a kiln (not shown in the figure).

The coating of the high-density plaster slurry has excellent adhesive strength with the front surface covering base paper 14 and adheres to the low-density plaster core. Since both the coating 56 and a hard edge layer are made from the same slurry, the adhesive strength is continuous and invariant over the front surface of the plaster board. As described above, it is required that the rotational velocity of the spreader roll 22 be controlled carefully so that the coating 56 with a desired thickness is formed, and it is important that the spreader roll 22 is driven with such an enough torque that the roll does not stop in operation. It is also important that the backing roll 23 applies pressure to the front surface covering base paper 14 and the spreader roll 22 and the front surface covering base paper 14 is stretched across the lower side of the spreader roll 22 so that the spreader roll 22 is cleaned by the front surface covering base paper 14.

In the particular embodiment of the apparatus according to the present invention, respective diameters of the spreader roll 22, the backing roll 23, and lump removing roll 24, pressure for contact between them, and gaps between the roll surfaces can be appropriately adjusted to be optimum.

Figure 4:
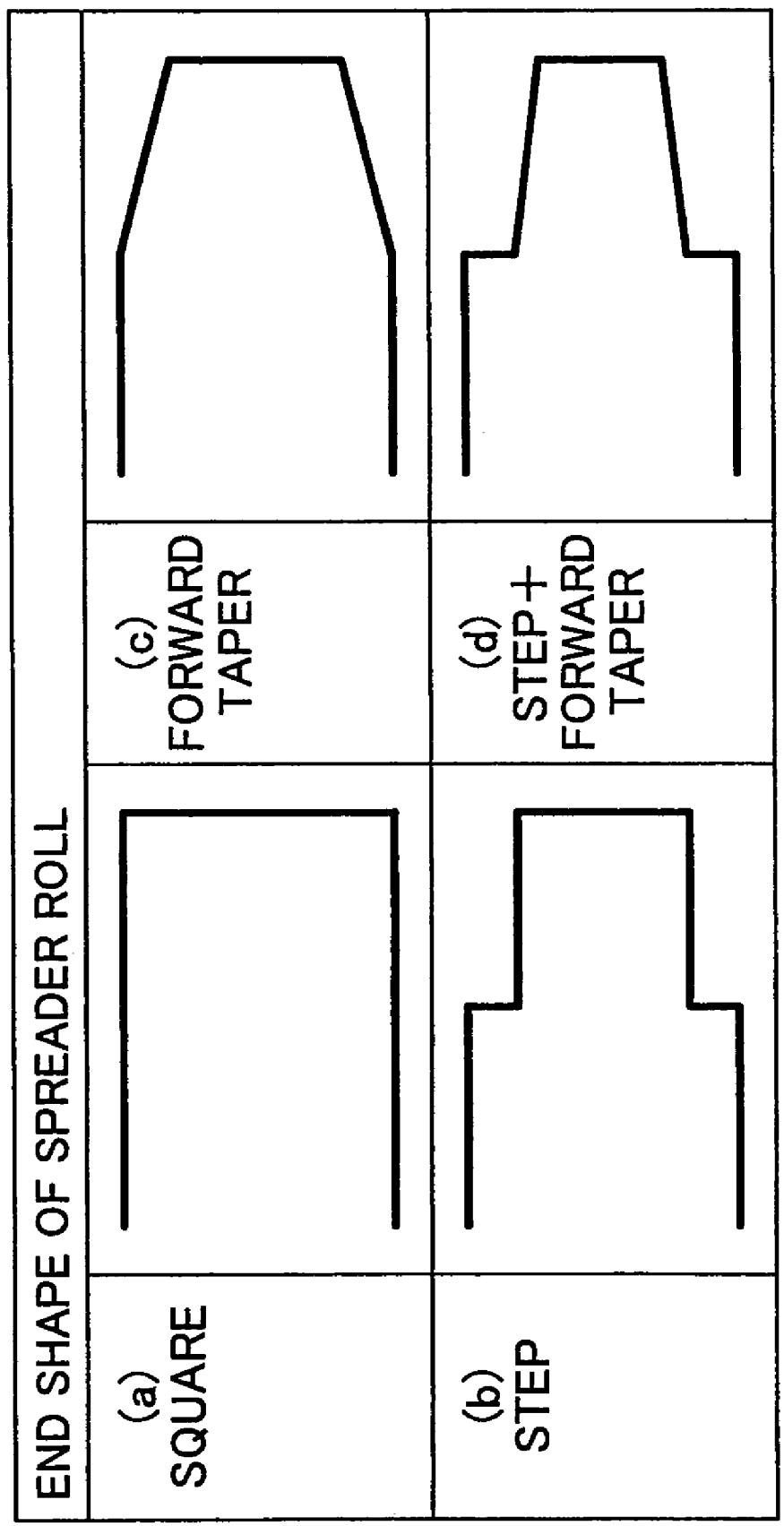
FIG. 4 is a diagram for illustrating a shape of an end of a spreader roll used in the present invention.

FIG. 4 shows examples of the shape of an end of the spreader roll, (a) square, (b) step, (c) forward taper, and (d) combination of step and taper. Thus, the thickness of the slurry for application can be intentionally increased and the amount of the slurry for application leaking to the non-spread portion can be adjusted by changing the shape of both ends of the spreader roll.

Figure 5:
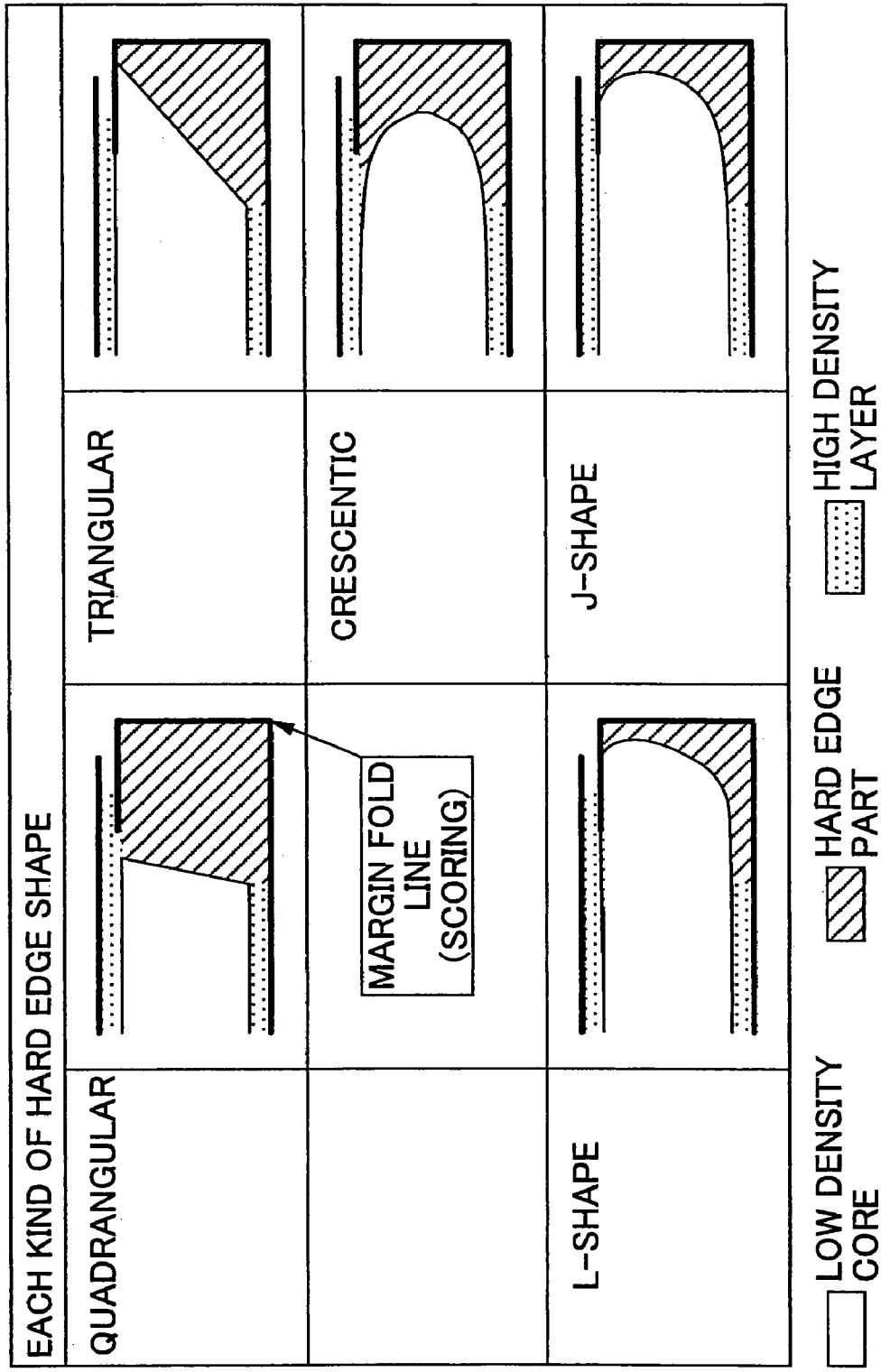
FIG. 5 is a diagram for illustrating a shape of a hard edge part of a plaster board according to the present invention.

The length of the hard edge part formed from the non-spread portion of the slurry for application in the directions of the width of the plaster board is approximately 0.1 mm through approximately 15.0 mm. Also, the hard edge part has various shapes such as a quadrangular shape, a triangular shape, a crescentic shape, a L-shape, and a J-shape in a cross section in the directions of the width of the plaster board. FIG. 5 illustrates the shapes of the hard edge part of the plaster board according to the present invention.

FIG. 6 through FIG. 10 show an embodiment of the mixer 10.

Figure 6:
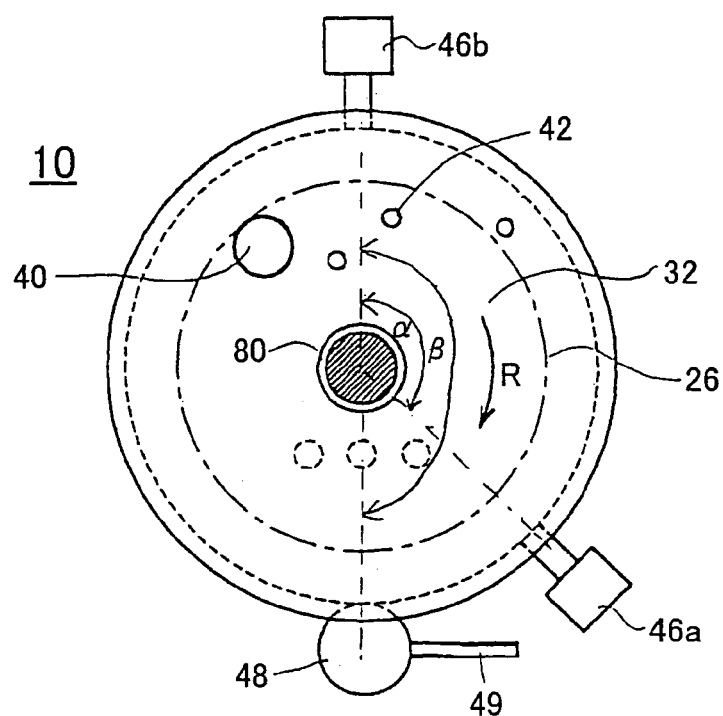
FIG. 6 is a plan view of a mixer used in the present invention.
Figure 7:
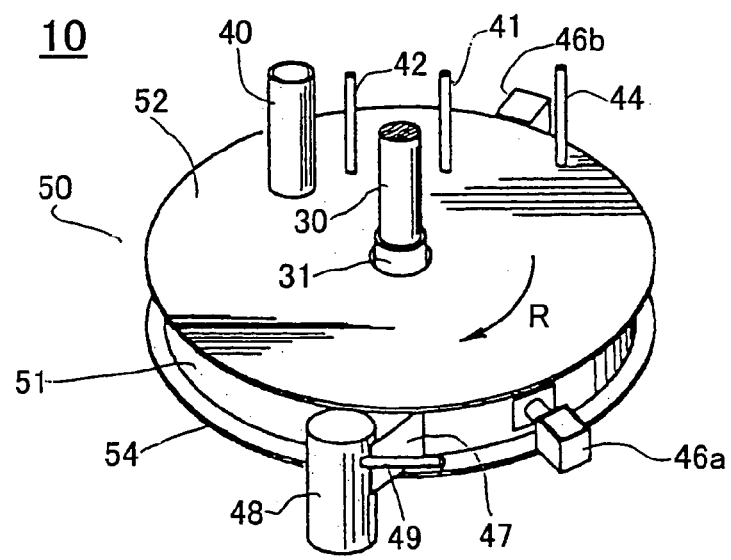
FIG. 7 is a perspective view of a mixer used in the present invention.

FIG. 6 and FIG. 7 are a plan view and a perspective view of the mixer 10, respectively. As shown in FIG. 6 and FIG. 7, the mixer 10 has a cylindrical housing 50, and the housing 50 has a disk-shaped upper plate or upper cover 52 and a disk-shaped lower plate or bottom cover 54 (referred to as an upper plate 52 and a lower plate 54, below) that are spaced from each other at a certain distance, and a peripheral wall or ring wall 51 disposed at periphery of the upper plate 52 and the lower plate 54. At the center of the upper plate 52, a circular port 80 is formed and an enlarged lower end 31 of a rotation axis 30 perpendicular to the upper plate 52 perforates through the circular port 80. The rotation axis 30 is coupled to a rotary driving device, for example, an electric motor (not shown in the figures). If desired, a speed change gear, for example, a speed variation toothed gear or a belt-type speed change gear may be provided between the rotation axis 30 and an output shaft of a rotary deriving device. In the upper plate 52, a powder providing pipe 40 for providing a slurry component that should be kneaded, a water supply pipe 42 for providing water for kneading, and an internal pressure adjusting device 43 for suppressing excessive elevation of the internal pressure (represented by a dashed line) are coupled at a certain angle with each other.

Figure 8:
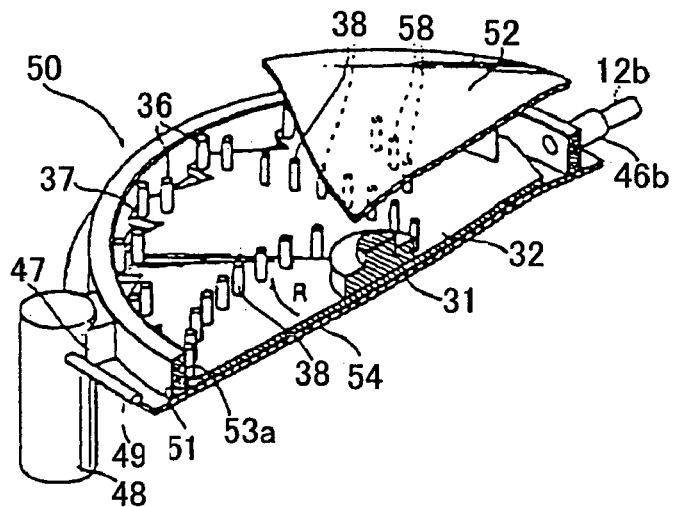
FIG. 8 is a partial sectional view of a mixer used in the present invention.
Figure 9:
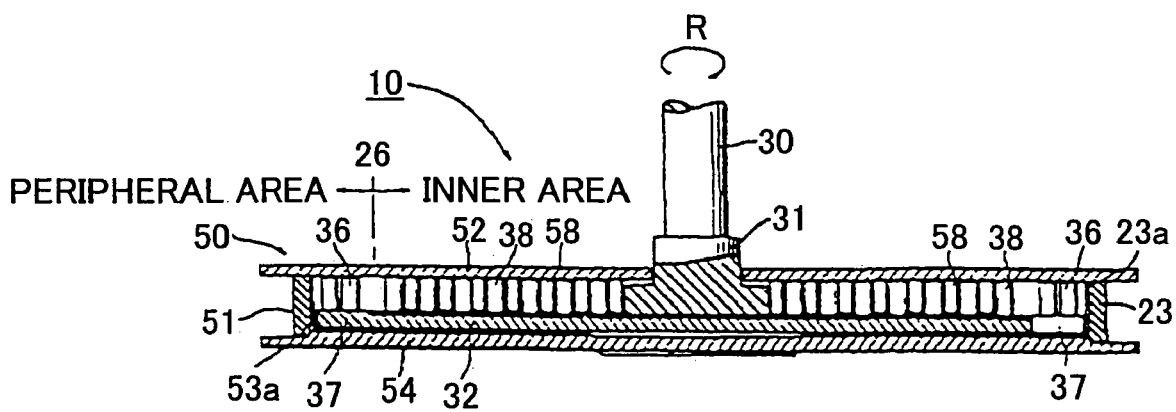
FIG. 9 is a longitudinal sectional view of a mixer used in the present invention.
Figure 10:
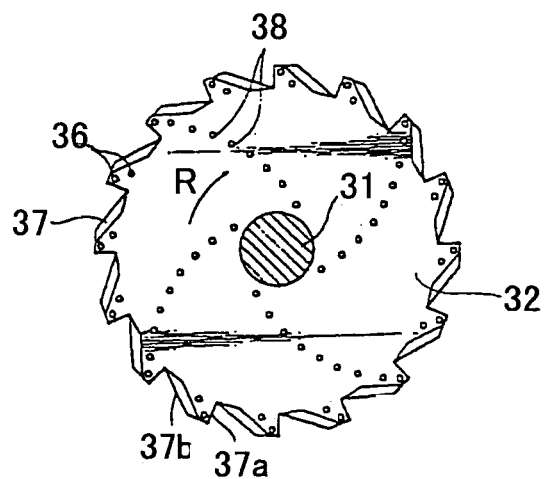
FIG. 10 is a diagram for illustrating a rotating disk provided in a mixer used in the present invention.

FIG. 8 is a partial sectional view of the mixer 10 and FIG. 9 is a longitudinal sectional view of the mixer 10. Also, FIG. 10 shows a rotating disk provided inside the mixer 10. In the housing 50, the rotating disk 32 is rotatably disposed. The central part of the rotating disk 32 is fixed on the lower surface of the enlarged lower end 31 of the rotation axis 30 and the line of the central axis of the rotating disk 32 corresponds to the line of the rotation axis 30. The rotating disk 32 rotates to the direction represented by the arrow R (clockwise direction) due to rotation of the rotation axis 30. The mixer having such a structure is called a pin-type kneading machine (pin mixer), for example, disclosed in U.S. Pat. No. 3,459,620.

The area in the housing 50 is compartmented into an inner area and a peripheral area with a virtual boundary 26. However, a ring-shaped wall perpendicular to the lower surface of the upper plate 52 may be provided along the boundary 26 in the housing 50. In this case, the ring-shaped wall is disposed substantially concentric with the ring wall 51. The area in the housing 50 is clearly compartmented into a peripheral area located at the neighborhood of a wear resistant ring 53a fixed on the internal surface of the ring wall 51 and an inner area located inward in the radial direction of the housing 50. As shown in FIG. 10 in detail, many tooth-profile parts are formed on the peripheral area of the rotating disk 32. Each tooth-profile part has backward edges 37a substantially extending in the radial direction of the rotating disk 20 and forward edges 37b that are inclined forward at a certain angle relative to the rotation direction. Each forward edge 37b pressurizes or energizes the kneaded fluid outwardly and in the rotation direction. Two pins 36 are provided on each tooth-profile part 37. Also, a plurality of pins 38 are disposed in the inner area, and the pins 38 are arranged in a plurality of series extending generally in the radial directions and provided on the upper surface of the rotating disk 32. Each series of the pins 38 is arranged on a curved line extending from the periphery of the enlarged lower end 31 to the pin 36 on the tooth-profile part 37. A plurality of pins 58 perpendicular to the upper plate 52 are arranged in the radial direction of the upper plate 52 and each pin 58 is positioned between the pins 38. Accordingly, when the pins 38 rotate, the pins 38 pass through an area between pins 58. Additionally, the pins 58 and 38 are detachably fixed on the rotating disk 32 and the upper plate 52, respectively, according to need, and the numbers of the pins 58 and 38 can be increased or decreased as desired.

The ring wall 51 is coupled to the upper end of a slurry delivering port 48 through a hollow delivery pipe 47. The slurry delivering port 48 is coupled to a foam providing port 49 for providing foam to the kneaded slurry component. Preferably, the foam providing port 49 is coupled in the vicinity of the delivery pipe 47 (in the example, the upper end of the slurry delivering port 48) so that the foam introduced into the slurry is uniformly distributed in the slurry. Also, a fractionation port 46 is set on the ring wall 51, and the fractionation port 46 includes two fractionation ports 46a and 46b. The fractionation ports 46a and 46b are disposed on the ring wall 51 at positions at a certain angle from the delivery pipe 47, respectively and coupled to the pipe lines 61 and 62, respectively. The fractionation port is provided with an input port for water and a set retarder (not shown in the figures), so that the density and the hardening time of the slurry for application 70 are adjusted. Furthermore, an input port for foam may be installed according to need. Additionally, in order to add such as water, a set retarder, and foam into the slurry for application 70, a sub-mixer may be installed in the pipe lines 61 and 62, and the slurry for application may be prepared by injecting water, the set retarder, or the foam into the sub-mixer, respectively, according to need.

It is preferable that the fractionation port be provided with a slit for preventing lumps from entering, which slit extend to the fractionation port along the peripheral area of the housing of the mixer. Also, as intermittent cleaning means for cleaning inside of the fractionation port regularly, a piston pin fitting to the shape of space as a channel of slurry inside the fractionation port and capable of changing the flow rate of the slurry is installed. In the preferred embodiment of the present invention, the intermittent cleaning is automatically performed per a certain period.

The delivery pipe 47 and the fractionation ports 46a and 46b are connected to inside of the housing 50 through apertures on the inner surface of the ring wall 51. The fractionation ports 46a and 46b are arranged at a certain angle α from each other, and the fractionation port 46a positioned at the side of rotation direction and the slurry delivering port 48 are arranged at a certain angle β from each other.

Next, the operation of the mixer 10 will be illustrated. Due to the operation of rotary driving device, the rotating disk 32 rotates to the direction of the arrow R, the slurry component that should be kneaded by the mixer 10 is provided through the powder providing pipe 40, and water for kneading is provided through the water supply pipe 42. The slurry component to be kneaded and water to be provided are introduced to the inner area in the mixer 10, stirred, mixed, and moved to the peripheral area over the boundary 26 outwardly above the rotating disk 32 due to centrifugal force. Comparably high-density slurry is pressurized outwardly and to the side of the rotation direction by the tooth-profile parts 37 so as to be introduced to the slurry delivering port 48 through the delivery pipe 47. The desired amount of the foam is provided to the slurry through the foam providing port 49 arranged to the delivery pipe 47 or the slurry delivering port 48 (arranged at the delivering port in the embodiment), so that the density of the slurry is adjusted to be low-density. The slurry delivering port 48 is connected to the pipe line 63 and comparably low-density slurry is provided to the central area in the directions of the width of the front surface covering base paper 14.

The slurry in the peripheral area is introduced to the pipe lines 61 and 62 through the respective fractionation ports 46a and 46b disposed at the upstream of the delivery pipe 47 for the slurry for core (at the direction opposite to the rotation) respectively, and is provided onto the roll coaters for the front surface covering base paper 14 and the back surface covering base paper 16 through the pipe lines 61 and 62, respectively. The slurry that is present close to the fractionation ports 46a and 46b is a slurry containing no foam and a slurry with higher density compared to the slurry for core 72. Accordingly, the slurry delivered to the roll coaters through the fractionation ports 46a and 46b has comparably high density. Thus, the mixer 10 provides comparably low-density slurry on the central area of the front surface covering base paper 14 through the slurry delivering port 48 and the delivery pipe 47 and provides comparably high-density slurry onto each roll coater for the front surface and back surface covering base paper through the fractionation ports 46a and 46b and the pipe lines 61 and 62. Accordingly, the raw materials for the plaster board that is delivered to a drying machine through the production line for the plaster board are contained as comparably low-density slurry on the central area of the front surface covering base paper and contained as comparably high-density slurry in a layer adhering to the base paper, and uniformly dried in a forced-drying machine at the downstream of the delivery line. Thus, the mixer 10 has the delivery pipe 47, the slurry delivering port 48, the foam providing port 49 for introducing foam to adjust the volume or the density of the slurry for core 72, the two fractionation ports 46a and 46b disposed at the upstream of the delivery pipe 47 (at the side opposite to the rotation direction), respectively. The slurry delivering port 48 is connected to the delivery pipe 47 for providing the slurry onto the central area of the front surface covering base paper 14, and the fractionation ports 46a and 46b are connected to the pipe lines 61 and 62 for providing the slurry onto the roll coater for the front surface covering base paper 14. According to such mixer 10, a low-density slurry and a high-density slurry are prepared by a single mixer, respectively, and the high-density and low-density slurries can be provided at the desired site in the production line for the plaster board, respectively. Additionally, maintenance work, etc. can be largely simplified by using the above mixer 10.

Furthermore, the total amount of the foam can be mixed in the slurry in the slurry delivering port 48 through the foam providing port 49. Also, foam may be additionally mixed in the slurry in the slurry delivering port 48 through the foam providing port 49. In the embodiment, the mixer 10 has the two fractionation ports 46a and 46b. However, alternatively, the fractionation port 46b can be omitted or not used and the pipe lines 61 and 62 connecting to the fractionation port 46a can be branched so as to provide the slurry for application onto the two roll coaters for the covering base papers. Also, the fractionation port may be disposed on the upper plate 52 or the lower plate 54. In the embodiment, the mixer 10 has been illustrated as a pin-type mixer. However, the configuration of the present invention can be similarly applied to other types of mixers such as a blade-type mixer having tilted blades, etc., as can be easily understood by a person skilled in the art. Also, an additional foam providing pipe, for example, the providing pipe 41 for providing foam to the slurry in the inner area can be provided to the mixer 10 so as to provide foam to the slurry in the inner area additionally. In this case, since the obtained different kinds of slurries are both light-weight and the density difference of the slurries is large, the obtained slurries are suitable for fabricating a lightweight plaster board.

As described above, for example, as the result of a comparison of one driving state in which the delivered slurry was prepared by mixing foam into the slurry in the mixer such that the density of the slurry after drying and hardening was 0.45 through 0.75 g/cm$^3$, with the other driving state in which the slurry in the mixer 10 was prepared such that the density of the slurry after drying and hardening was 0.80 through 1.40 g/cm$^3$ and the slurry in the delivering port of the mixer 10 was prepared such that the density of the slurry after drying and hardening was 0.45 through 0.75 g/cm$^3$, in the latter driving state a loading of the foam for adjusting the volume (density) of the slurry could be reduced to be equal to or less than approximately half.

EXAMPLE

Various kinds of properties of the plaster board that was fabricated by the fabrication method for the plaster board according to the present invention are shown in FIGS. 11A and 11B, compared to ones of the plaster board fabricated by the conventional fabrication method.

The methods of measurement and evaluation of the various kinds of properties shown in examples and comparisons will be shown below. Herein, for the evaluation of their properties, a plaster board with the width of 910 mm×the length of 1,820 mm×the thickness of 12.5 mm was used and each property value was measured by the following method.

1. The average thickness of the high-density layer: being calculated from 3 or more measurement values in a scanning electron micrograph of a cross section of the plaster board.
2. Each kind of thickness of the hard edge: being measured from a cross sectional photograph of a side end of the plaster board (see FIG. 13).

3. The adhesive property of the base paper: the required number of test pieces with the width of 90 mm parallel to the direction of the width of the plaster board×the length of 150 mm were cut out. Then, the plaster board was folded at cut lines that were applied along the direction of the width on the front surface and the back surface by a cutter, and the base paper on the surface opposite to the surface on which a cross section was observed was peeled. The adhesion state for the base paper and the plaster core was observed over the length of 50 mm along the longitudinal directions. In FIG. 11B, O designates plaster boards in which the base paper and the plaster core adhered over 80% of the length of 50 mm and x designates other plaster boards.
4. The dry-out (adhesion at a deckle edge): test pieces were taken from the side edge parts of the side surfaces of an excessively dried plaster board, the adhesion state of the plaster core and the base paper at the side edge parts was observed. O designates the plaster boards in which the adhesion of the plaster core and the base paper was good, and x designates the plaster boards in which the adhesion was not good due to strength reduction originating from excess drying.
5. The resistance against pulling out of a nail: four test pieces of 152 mm×152 mm were taken and a guide hole was opened on the central part of the test piece, based on ASTMC 473. A nail with a body of 2.515 mm and a head of 6.350 mm on which a constant load was applied was inserted through the hole, and a minimum load capable for causing the nail to perforate through the test piece was measured.
6. The flexural strength: being evaluated based on JIS A6901"plaster board products".
7. The nailing property: A nail for plaster board according to JIS A5508 (with the length of 38 mm×the diameter of body of 2.3 mm×the diameter of head of 7.5 mm) was hammered to the plaster board at the position of 10 mm from an edge of the plaster board and at 100 mm intervals parallel to a side of the plaster board. Then, the plaster board was observed with regard to the presence of a break or a crack in the plaster board. O designates the plaster boards in which a break or a crack was not observed, and x designates the plaster boards in which a break or a crack was observed.

In each example, the length of a roller of the roll coater had a variation of 98 through 108% of the width between the scorings of the base paper, and a plaster board having the high or low-density of the hard edge was employed.

Examples 1, 2, and 3 are examples in which the lengths of the rollers are 98%, 102%, and 108% of the width between the scorings of the front surface covering base paper, defining the width of the plaster board, respectively. Also, Examples 4 and 5 are examples of the plaster boards having a low density of hard edge or a high density of hard edge. Additionally, comparison 1 is an example of a multi-layer core made from a single foamed slurry, comparison 2 is an example of the combination of comparison 1 with hard edge slurry, and comparison 3 is an example in which the length of the roller is 95% of the width between scorings of the front surface covering base paper, defining the width of the plaster board.

From these experimental results for the examples, it is appreciated that the plaster board according to the present invention holds good properties for a plaster board and is excellent in both prevention of dry-out and the nailing property.

Figure 12:
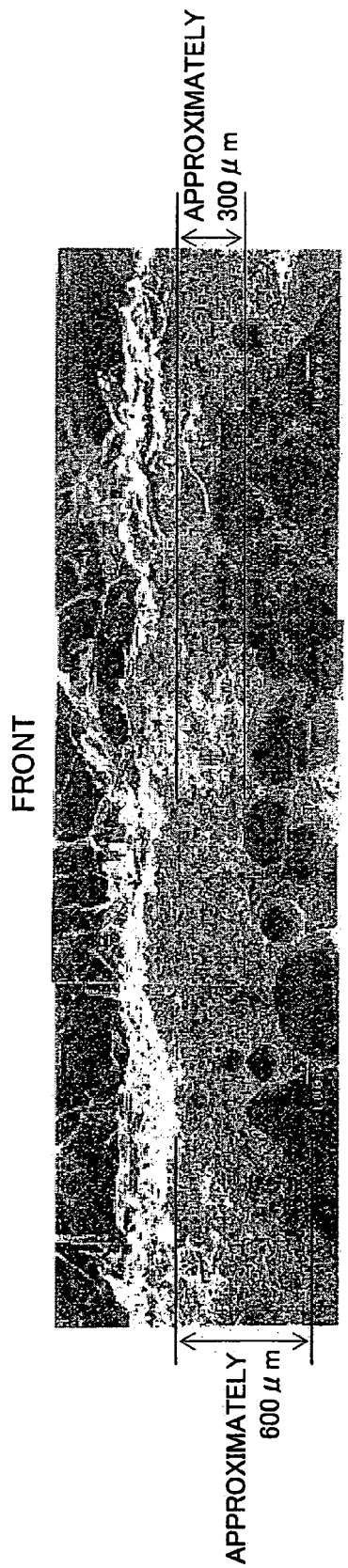
FIG. 12 is an electron micrograph of a cross section in a high-density layer adhering to a front surface covering base paper near the central part of a plaster board according to the present invention.

FIG. 12 is a SEM photograph of a adhesion part of the front surface covering base paper and the high density layer near the center of a cross section along the direction of the width of the plaster board according to the present invention. The photograph shows that the thickness of the adhesion interface between the high-density layer originating from a coating of the slurry for application spread on the base paper by the spreader roll and the covering base paper is approximately 300 μm through 600 μm.

Figure 13:
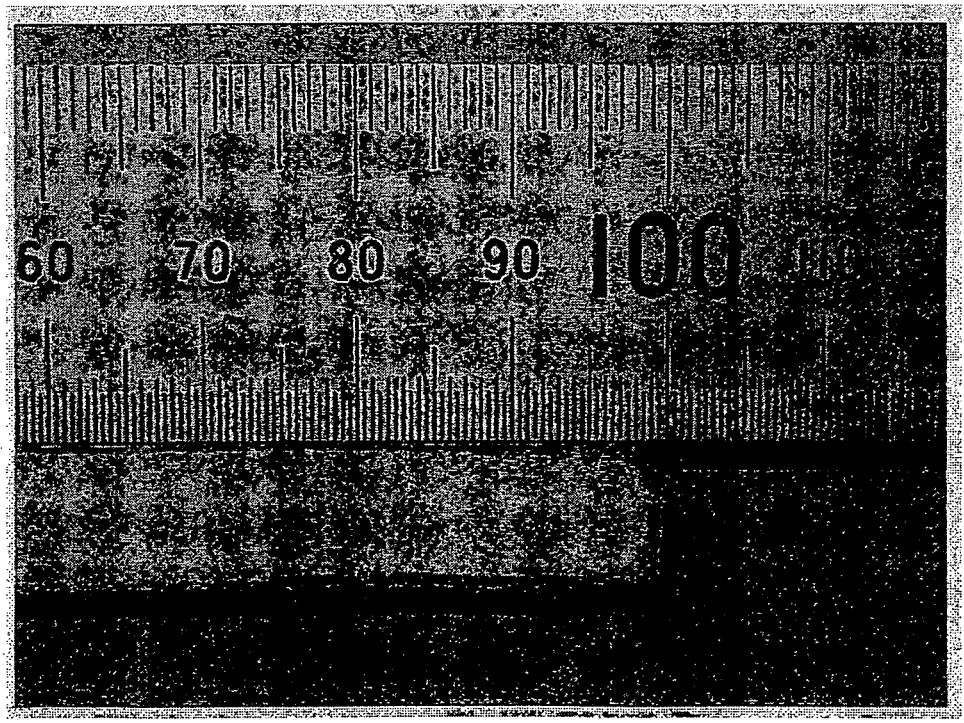
FIG. 13 is a macrophotograph of a cross section in a side end of a plaster board according to the present invention.

FIG. 13 is a photograph of a cross section of a side end of the plaster board having a bevel edge according to the present invention. In the photograph, the lower base paper is the back surface covering base paper, and the upper base paper is the front surface covering base paper.

The photograph show that the shape of the hard edge part of the plaster board originating from the non-spread portion formed outside an end of the spreader roll when the slurry for application is applied on the front surface covering base paper is L-shaped or J-shaped. In addition the thickness of the hard edge part or the minimum thickness and the maximum thickness at the adhesion part of the hard edge part and the base paper, along the direction of the width of the plaster board are shown.

Additionally, the present invention is not limited to the examples described above, and it is obvious that various modifications and changes within the scope of the present invention can be made.

INDUSTRIAL APPLICABILITY

As described above, according to the preset invention, a lightweight plaster board having a cellular porous plaster core, excellent in adhesion to a covering base paper for a plaster board, free from dry-out in side edge parts of the plaster board due to forced drying in time of fabricating the plaster board, and with no disadvantage in workability for driving a nail into the plaster board can be obtained.

Also, in accordance with a method of fabricating a plaster board according to the present invention, a plaster board, excellent in adhesion of a cellular porous plaster core and a covering base paper, preventing the dry-out, and with no disadvantage in driving a nail, can be fabricated by providing the uniform cellular porous plaster core without wasting a foaming agent and foam generated from the foaming agent.

The invention claimed is:

1. A plaster board comprising:
   a plaster core having a front surface, a back surface, a first side surface, and a second side surface opposite the first side surface, and two opposite end surfaces, and
   a covering base paper covering the front surface, the back surface, the first side surface, and the second side surface of the plaster core,
   the plaster core comprising:
      a first high-density hard edge part comprising the first side surface and a second high-density hard edge part comprising the second side surface, the first and second high-density hard edge parts being covered with the covering base paper;
      at least one high-density layer comprising the front surface or back surface of the plaster core and being covered with the covering base paper, the at least one high-density layer being continuous with and extending between the first high-density hard edge part and the second high-density hard edge part and having a density substantially equal to densities of the first and second high-density hard edge parts; and
      a central low-density part having a density less than the densities of the first and second high-density hard edge parts and the high-density layer and being inscribed in the first and second high-density hard edge parts and the high-density layer, wherein each of the first and second high-density hard edge parts has a minimum thickness of about 2.0 mm and a maximum thickness of about 10.0 mm in directions perpendicular to one of the first or second side surfaces of the plaster core.

2. The plaster board as claimed in claim 1, wherein the high-density layer has a thickness of 0.1 mm to 1.2 mm in directions perpendicular to the front surface or the back surface of the plaster core.

3. The plaster board as claimed in claim 1, wherein a cross-sectional shape of each of the first and second high-density hard edge parts in directions perpendicular to the front surface or back surface of the plaster core and one of the first or second side surfaces is selected from the group consisting of a quadrangular shape, a triangular shape, a crescentic shape, an L-shape, and a J-shape.

4. The plaster board as claimed in claim 1, wherein a cross-sectional shape of each of the first and second high-density hard edge parts in directions perpendicular to the front surface or back surface of the plaster core and one of the first or second side surfaces is an L-shape or a J-shape.

5. The plaster board as claimed in claim 1, wherein the at least one high-density layer has a density equal to densities of the first and second high-density hard edge parts.

* * * * *